United States Patent [19]

Chesney et al.

[11] Patent Number: 5,250,880
[45] Date of Patent: Oct. 5, 1993

[54] LINEAR MOTOR CONTROL SYSTEM AND METHOD

[75] Inventors: David J. Chesney, Livonia; Robert C. Petrof, Farmington Hills; Nathaniel L. Field, Northville; Bernard Huang, Ann Arbor; John W. Grant, Plymouth, all of Mich.

[73] Assignee: Ford Motor Company, Dearborn, Mich.

[21] Appl. No.: 965,146

[22] Filed: Oct. 22, 1992

[51] Int. Cl.$^5$ .......................... H02K 41/02; B23C 9/00
[52] U.S. Cl. ...................................... 318/135; 409/141
[58] Field of Search ................. 318/128, 135, 687; 408/143; 409/141; 82/118, 137, 158, 163

[56] References Cited

U.S. PATENT DOCUMENTS

| | | | |
|---|---|---|---|
| 3,967,515 | 7/1976 | Nachtigal et al. | 409/141 X |
| 4,760,750 | 8/1988 | Kondoh | 409/141 X |
| 4,808,901 | 2/1989 | Sakamoto | 318/687 |
| 4,921,365 | 5/1990 | Sanders, Jr. et al. | 400/322 |
| 4,922,159 | 5/1990 | Phillips et al. | 318/128 |
| 4,967,293 | 10/1990 | Aruga et al. | 360/78.12 |

*Primary Examiner*—Steven L. Stephan
*Assistant Examiner*—Judson H. Jones
*Attorney, Agent, or Firm*—Roger L. May; Joseph W. Malleck

[57] ABSTRACT

A linear motor control system and method to increase apparent motor stiffness by providing linear motor resistance to perturbations caused by external forces exerted on a slide mass and a base mass. Primary and secondary sensors detect the accelerations of the slide mass and the base mass relative to ground and generate acceleration signals corresponding thereto. A position detector senses the position of the slide mass relative to the base mass and generates a position signal corresponding thereto. A signal processor processes the first and second acceleration signals and the position signal to determine deviations in the position, velocity and acceleration of the slide mass relative to the base mass from selected values caused by the external forces, and to generate a motor control signal to provide linear motor resistance against such deviations.

13 Claims, 3 Drawing Sheets

LINEAR MOTOR CONTROL SYSTEM AND METHOD

TECHNICAL FIELD

This invention relates generally to a system and method for controlling linear motors. More specifically, this invention relates to an improved system and method for controlling linear motors to increase apparent motor stiffness in response to perturbations caused by external forces in machine tool applications.

BACKGROUND ART

Improved efficiency and productivity are constant objectives in modern manufacturing operations. Increasingly, high speed manufacturing has been utilized to help accomplish such objectives. However, high speed manufacturing can be difficult to achieve with conventional devices and can introduce its own attendant problems.

In the area of machine tool operations, high speed manufacturing poses a variety of problems. Conventional machine tool operations utilize ball screw or other mechanical means to drive a workpiece relative to a cutting tool, such as a milling head. These mechanical drives, however, suffer from attendant wear characteristics caused by extended use over prolonged periods of time. Wear associated with mechanical drives becomes increasingly problematic in high speed operations. High speed operations can cause increased and rapid wear to conventional mechanical drives. Under such conditions, mechanical drives require more frequent maintenance, resulting in decreased efficiency and productivity.

To eliminate this attendant wear problem, conventional mechanical drives can be replaced with linear motors. Linear motors are also well suited to high speed operations. However, a drawback of linear motors for machine tool applications has been a relative lack of stiffness to resist perturbations caused by the external forces associated with machine tool operations.

During an ordinary machine tool operation, a workpiece is secured to a platform that is driven mechanically relative to a cutting tool. Various external forces may be exerted on the machine tool platform. The most common is the force associated with the contact between the cutting tool and the workpiece. Conventional mechanical drives have an inherent stiffness or resistance to such external forces, arising from friction between the component parts of the mechanical drive. In contrast, linear motors are driven by electromagnetic field variations. As a result, linear motors lack any inherent stiffness to resist such external forces.

Linear motors can, however, be provided with apparent stiffness. This is accomplished through the use of the motor servo controls to correct for deviations from a predetermined position. Nevertheless, conventional linear motor applications have been able to generate measured stiffnesses only on the order of 10,000-50,000 lbs/inch. Unfortunately, such stiffnesses are well below those necessary to meet the quality control requirements of high speed machine tool applications.

U.S. Pat. No. 4,808,901 issued to Sakamoto discloses a typical control apparatus for a linear motor for use in conjunction with an optical disk drive unit. The control apparatus of the Sakamoto patent utilizes position detecting means to generate a present position signal for the moving coil of the linear motor. Through differentiation of the present position signal, present speed and acceleration signals are generated. Deviations of the moving coil's present position, speed and acceleration from designated target position, speed and acceleration are then calculated and used to generate position, speed and acceleration deviation signals. A control signal is generated based upon these present and deviation signals to properly locate the moving coil of the linear motor. The apparatus also utilizes an inclination angle detector to generate an inclination angle signal due to tilting of the optical disk drive, thereby controlling position independent of the Earth's gravitational field.

Significantly, however, the control apparatus of the Sakamoto patent determines acceleration of the linear motor by differentiation of the motor position signal. Differentiation of inherent error in the present position signal merely compounds such error resulting in inaccurate acceleration determinations. Moreover, the control apparatus of the Sakamoto patent does not specifically address the stiffness problems associated with linear motors as previously discussed. As a result, such a control apparatus is incapable of providing the apparent stiffness to a linear motor to resist perturbations caused by external forces present in ordinary high speed machine tool applications.

U.S. Pat. No. 4,921,365 issued to Sanders et al discloses a high speed shuttle printer. The device utilizes a position detector for determining the position of a linear motor used to drive the shuttle of a dot matrix printer. The position detector may be an accelerometer which measures shuttle acceleration. In such a case, position is determined by integration of an acceleration signal. As with differentiation, integration of inherent error in the acceleration signal merely compounds such error resulting in inaccurate position determinations, often referred to as "drift". Once again, however, the device of the Sanders patent does not specifically address the stiffness problems associated with linear motors as previously discussed. As a result, the device cannot provide the apparent linear motor stiffness necessary to resist perturbations caused by external forces present in ordinary high speed machine tool applications.

U.S. Pat. No. 4,967,293 issued to Aruga et al discloses a multi-positioner magnetic disk storage apparatus having means for reducing mechanical vibration interference between positioners. The device disclosed by the Aruga patent utilizes a vibration sensor, such as an accelerometer, to detect vibrations caused by magnetic disk operation. The device then generates additional vibrations designed to cancel or dampen the vibrations caused by magnetic disk operation. However, the device of the Aruga patent is not designed for force rejection and does not specifically address the stiffness problems associated with linear motors as previously discussed. Once again, therefore, the device cannot provide the apparent linear motor stiffness necessary to resist perturbations caused by external forces present in ordinary high speed machine tool applications.

SUMMARY OF THE INVENTION

According to the present invention, an improved linear motor control system and method are provided for increasing motor resistance to external forces during operation. The system comprises primary sensor means for detecting the acceleration of a slide mass relative to ground and generating a corresponding first acceleration signal. The system also comprises secondary sensor means for detecting the acceleration of a base mass relative to ground and generating a corresponding second acceleration signal.

The system further comprises position detector means for detecting the position of the slide mass relative to the base mass and generating a corresponding position signal. The system still further comprises signal processor means for processing the first and second acceleration signals and the position signal and generating a motor control signal to provide the linear motor resistance to the external forces.

The linear motor control method for increasing motor resistance to external forces during operation comprises the steps of detecting the acceleration of the slide mass and the base mass relative to ground, and generating corresponding first and second acceleration signals, respectively. The method also comprises the steps of detecting the position of the slide mass relative to the base mass and generating a corresponding position signal.

The method further comprises the step of processing the first and second acceleration signals and the position signal to determine deviations of the position, velocity and acceleration of the slide mass relative to the base mass from selected values caused by the external forces. The method still further comprises the step of generating a motor control signal to provide the linear motor resistance to such deviations.

Accordingly, it is a principle object of this invention to provide an improved linear motor control system and method for increasing apparent motor stiffness by providing linear motor resistance to perturbations caused by external forces utilizing multiple feedback control.

Another principle object of this invention is to provide an improved linear motor control system and method for increasing apparent motor stiffness by providing linear motor resistance to perturbations caused by external forces during machine tool applications utilizing the acceleration of a slide mass relative to a base mass.

Yet another object of this invention is to provide an improved linear motor control system and method for increasing apparent motor stiffness by providing linear motor resistance to perturbations caused by external forces during machine tool applications utilizing position and velocity parameters of a slide mass relative to a base mass.

These and other objects and advantages will be readily apparent upon consideration of the following detailed description and drawings.

DETAILED DESCRIPTION OF THE INVENTION

Figure 1:
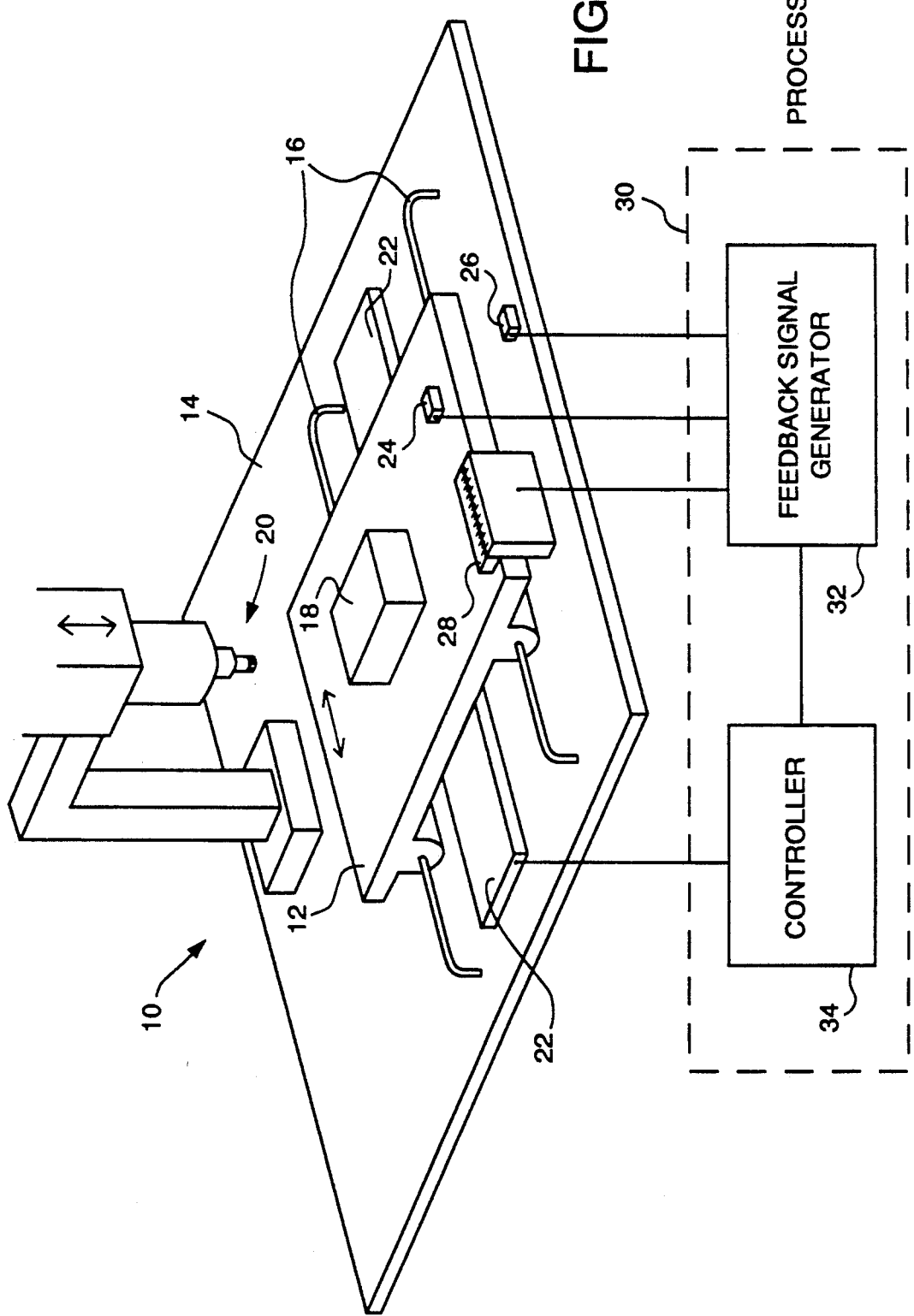
FIG. 1 is a perspective view of the improved linear motor control system of the present invention.

Referring to FIG. 1, the linear motor control system 10 of the present invention is shown. The system 10 comprises a slide mass 12 and a base mass 14 having rails 16 fixed thereto. The slide mass 12 is slidably mounted to rails 16. In an ordinary machine tool application, slide mass 12 serves as a platform upon which workpiece 18 is mounted for machining by cutting tool 20. To this end, slide mass 12 is unidirectionally movable in a plane oriented substantially horizontally with respect to ground and is driven by a brushless (permanent magnet) synchronous linear motor, linear induction motor, or similar motor 22. The slide mass 12, base mass 14, rails 16 and linear motor 22 are of ordinary design well known in the art.

As shown in FIG. 1, cutting tool 20 is typically a milling head. However, cutting tool 20 may also be any number of other machine tools, such as a bore. Additionally, cutting tool 20 is typically fixed to base 14. As will be discussed in greater detail below, external forces exerted on slide mass 12 result primarily from contact between workpiece 18 and cutting tool 20. As a result, to provide linear motor stiffnesses necessary to resist such forces, the present invention corrects for forces on the slide mass 12 relative to the base mass 14.

Still referring to FIG. 1, a high bandwidth accelerometer 24 is mounted to the slide mass 12. The accelerometer 24 provides primary sensor means for detecting the acceleration of the slide mass 12 with respect to ground and for generating a first acceleration signal proportional thereto. The acceleration of the slide mass 12 with respect to ground is also referred to as the absolute acceleration of the slide mass 12. Extraneous mechanical vibration of the slide mass 12 in the direction of motion may result in anomalies in the detection of the absolute acceleration of the slide mass 12 by the accelerometer 24. Accordingly, the mounting location of the accelerometer 24 on the slide mass 12 is selected by experimental survey to minimize detection of such extraneous mechanical vibration.

A second high bandwidth accelerometer 26 is mounted to the base mass 14. The accelerometer 26 provides secondary sensor means for detecting the acceleration of the base mass 14 with respect to ground and generating a second acceleration signal proportional thereto. Once again, the acceleration of the base mass 14 with respect to ground is also referred to as the absolute acceleration of the base mass 14. As with accelerometer 24, the mounting location of the accelerometer 26 on the base mass 14 is selected by experimental survey to minimize detection of mechanical vibration of the base mass 14 in the direction of motion of the slide mass 12. Such a mounting location thereby reduces anomalies in the detection of the absolute acceleration of the base mass 14 by the accelerometer 26.

Still referring to FIG. 1, a position scale 28 is shown. Position scale 28 has a stationary portion mounted to the base mass 14, and a moving portion mounted to the slide mass 12. Position scale 28 provides position detector means for detecting the position of the slide mass 12 relative to the base mass 14, the relative position of the slide mass 12. Position scale 28 also generates a position signal corresponding to the relative position of the slide mass 12.

During operation of a machine tool, various external forces may be exerted on the slide mass 12 or base mass 14. The most common is the force associated with the contact between the cutting tool 20 and the workpiece 18. As previously described, accelerometers 24 and 26 measure the absolute acceleration of the slide mass 12 and base mass 14, respectively, and generate first and second acceleration signals corresponding thereto. The first and second signals therefore reflect absolute acceleration of the slide mass 12 and base mass 14 caused by such external forces. At the same time, position scale 28 measures the relative position of the slide mass 12 and generates a position signal corresponding thereto.

Still referring to FIG. 1, accelerometers 24 and 26 and position scale 28 are in electrical communication with processor 30. Processor 30 provides a means for processing the first and second acceleration signals and the position signal received from the accelerometers 24 and 26 and the position scale 28. Based upon the information of the first and second acceleration signals and the position signal, processor 30 generates a motor control signal for controlling the linear motor 22. The motor control signal operates to change the position, velocity and acceleration of the slide mass 12 in such a manner as to provide the linear motor 22 with the necessary stiffness to resist external forces exerted on the linear motor 22 arising during machine tool operations.

Processor 30 includes feedback signal generator 32 and controller 34. Feedback signal generator 32 provides feedback signal generating means in electrical communication with accelerometers 24 and 26 and position scale 28 for receiving the first and second acceleration signals and the position signal and generating a plurality of feedback signals corresponding to the position, velocity and acceleration of the slide mass 12 relative to the base mass 14, or the relative position, velocity and acceleration of the slide mass 12.

Feedback signal generator 32 is also in electrical communication with controller 34. Controller 34 provides control means for receiving the feedback signals of the feedback signal generator 32 and determining the deviation of the relative position, velocity and acceleration parameters of the slide mass 12 from selected values. Such deviations may be the result of external forces exerted on the slide mass 12 or base mass 14, such as those previously described.

Controller 34 is also in electrical communication with linear motor 22. Based upon the feedback signals, controller 34 further provides a means for generating a corresponding motor control signal. The motor control signal operates to regulate the current received by the motor 22 thereby changing the relative position, velocity and acceleration of the slide mass 12 to correct for relative position, velocity and acceleration deviations of the slide mass 12 caused by any external forces. The control signal generated by the controller 34 thereby provides the linear motor 22 with the necessary stiffness to resist external forces exerted on the linear motor 22.

Figure 2:
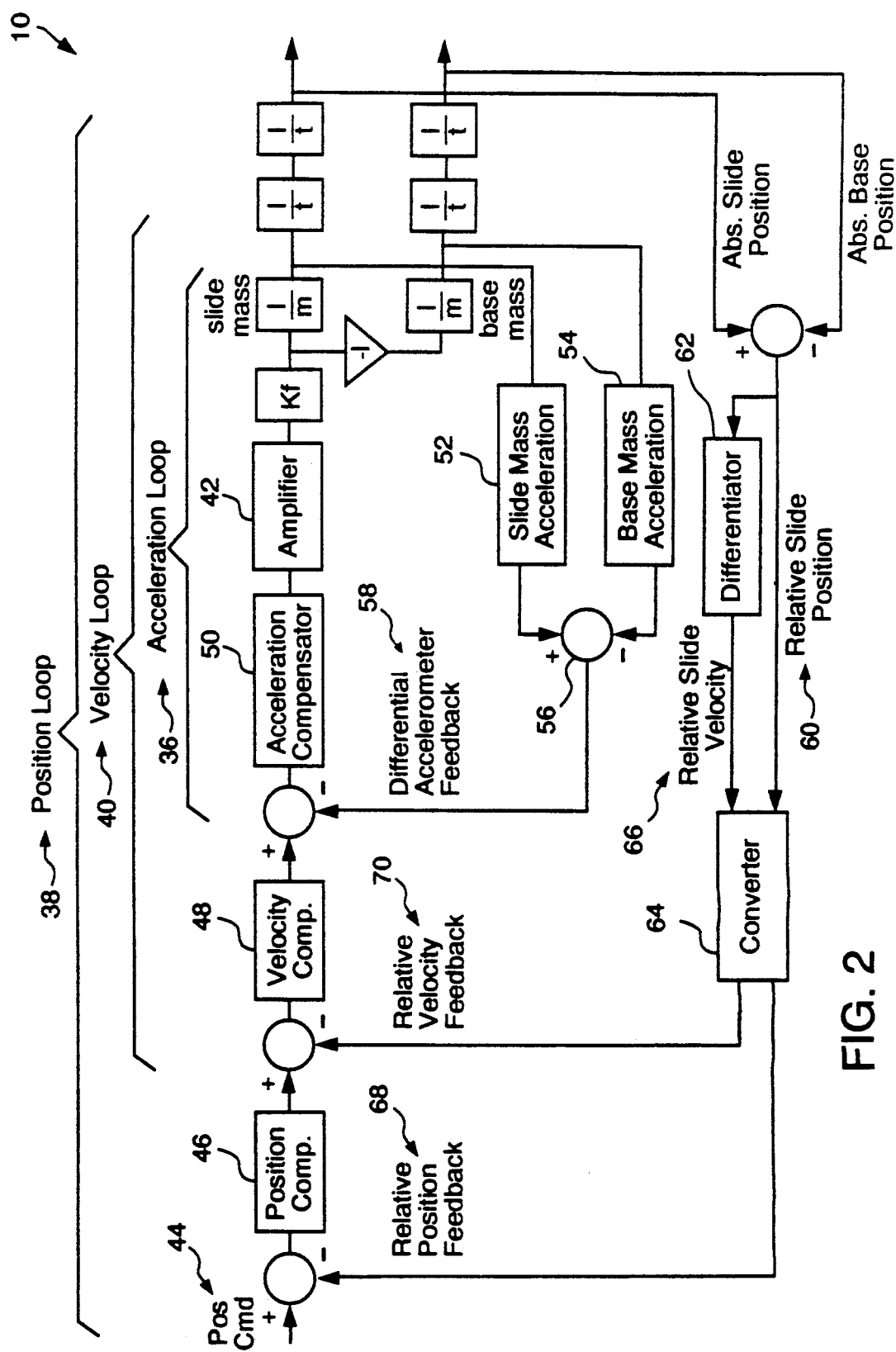
FIG. 2 is a logic diagram of the improved linear motor control system of the present invention.

Referring now to FIG. 2, a logic diagram of the control system 10 of the present invention is shown. The linear motor control system 10 as shown in FIG. 2 is characterized by an acceleration feedback loop 36 for force rejection, as well as a position feedback loop 38 and velocity feedback loop 40 for positioning accuracy and speed control. The key to the present invention generating improved linear motor stiffnesses sufficient to control perturbations caused by external forces in machine tool applications is setting high control loop gains.

To this end, compensation in the acceleration feedback loop 36 is of the double integral-lead type. Additionally, to maximize gain, accelerometers 24 and 26 and amplifier 42 in the acceleration feedback loop 36 should all be of high bandwidth design. In addition, amplifier 42 preferably has a pulse width modulator design. High acceleration feedback loop 36 gain is also facilitated by the proper mounting of accelerometers 24 and 26 on the slide mass 12 and base mass 14 by experimental survey as previously described. Accelerometers 24 and 26 should be mounted to reduce detection of extraneous vibrations in the slide mass 12 and base mass 14 in the direction of motion of the slide mass 12, which lead to anomalies in the detection of the absolute acceleration of the slide mass 12 and base mass 14. Such anomalies also result in inaccurate calculation of the relative acceleration of the slide mass 12.

In operation, a position command 44 is input into the linear motor control system 10 of the present invention. The position command 44 has a position compensator 46, a velocity compensator 48 and an acceleration compensator 50 associated therewith. Upon movement of the slide mass 12 by the linear motor 22 in response to the position command 44, accelerometers 24 and 26 measure the absolute forces exerted on the slide mass 12 and the base mass 14, respectively, by any of a variety of sources. To maximize gain and thereby improve linear motor stiffness, accelerometers 24 and 26 should be of high bandwidth design.

In response to the absolute forces exerted on the slide mass 12 and base mass 14, accelerometers 24 and 26 generate first and second acceleration signals, respectively. The first and second acceleration signals are then received by amplifier 42, which provides amplifier means for amplifying the first and second signals. Once again, to maximize gain and improve linear motor stiffness, amplifier 42 should have a high bandwidth design. Preferably, amplifier 42 also has a pulse width modulator design.

The first and second acceleration signals are proportional, respectively, to the absolute slide mass acceleration 52 and the absolute base mass acceleration 54 and are received by adder 56. Adder 56 is part of feedback signal generator 32 and provides subtractor means for subtracting the absolute acceleration 54 of the base mass 14 from the absolute acceleration 52 of the slide mass 12 to provide a differential accelerometer feedback signal 58. The differential accelerometer feedback signal 58 corresponds to the acceleration of the slide mass 12 relative to the base mass 14, the relative acceleration of the slide mass 12. The linear motor control system 10 thereby corrects for any acceleration of the base mass 14. Once again, to maximize gain and improve linear motor stiffness, compensation in the acceleration feedback loop 36 is of the double integral lead type.

Still referring to FIG. 2, feedback signal generator 32 also receives the relative slide mass position 60 from position scale 28 corresponding to the position of the slide mass 12 relative to the base mass 14. The present invention thereby corrects for any positional changes of the base mass 14. To this end, feedback signal generator 32 also comprises a differentiator 62. Differentiator 62 provides differentiator means for differentiating the relative slide mass position 60 to determine a relative slide mass velocity 66. The present invention thereby corrects for any velocity changes of the base mass 14.

Feedback signal generator 32 also comprises a convertor 64. Convertor 64 provides convertor means for converting relative slide mass position and velocity 60,66 from analogue to digital form. Convertor 64 also serves to generate relative position feedback signal 68 and relative velocity feedback signal 70.

The differential accelerometer feedback signal 58, relative position feedback signal 68 and relative velocity feedback signal 70 are received by the controller 34 of the processor 30. Controller 34 then directs feedback signals 58, 68 and 70 to the corresponding acceleration compensator 50, position compensator 46 and velocity compensator 48 of the position command 44 to determine deviations to the relative position, velocity and acceleration of the slide mass 12 from selected position, velocity and acceleration parameters governed by the preselected position command 44.

Based upon the determination of deviations to the relative position, velocity and acceleration of the slide mass 12 from selected values, controller 34 generates a motor control signal. Controller 34 includes a high bandwidth amplifier (not shown) for amplifying the motor control signal. The motor control signal operates to regulate the current received by the linear motor 22 thereby changing the relative position, velocity and acceleration of the slide mass 12 thus correcting for relative position, velocity and acceleration deviations of the slide mass 12 caused by any external forces. The control signal generated by the controller 34 thereby provides the linear motor 22 with the necessary stiffness to resist external forces exerted on the linear motor 22.

Figure 3:
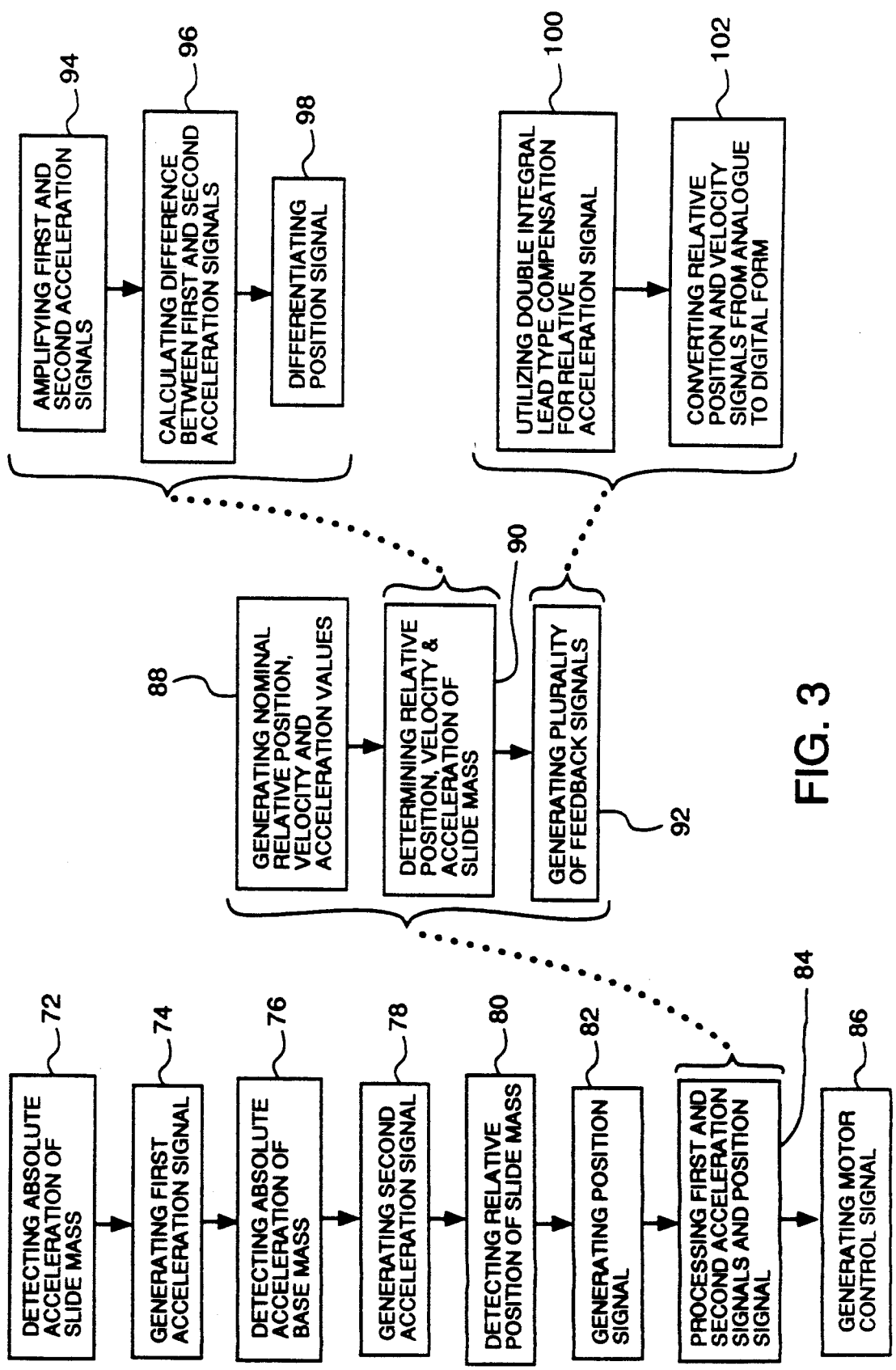
FIG. 3 is a block diagram of the improved linear motor control method of the present invention.

Referring now to FIG. 3, a block diagram of the linear motor control method of the present invention is shown. The method begins with the steps of detecting 72 the acceleration of the slide mass 12 relative to ground (absolute acceleration) and generating 74 a first acceleration signal corresponding thereto. The method also includes the steps of detecting 76 the acceleration of the base mass 14 relative to ground (absolute acceleration) and generating 78 a second acceleration signal corresponding thereto. The method further includes the steps of detecting 80 the position of the slide mass 12 relative to the base mass 14 (relative position) and generating 82 a position signal corresponding thereto.

The method includes the still further step of processing 84 the first and second acceleration signals and the position signal to determine deviations of the position, velocity and acceleration of the slide mass 12 relative to base mass 14 from selected values caused by any external forces. The method also includes the step of generating 86 a motor control signal for receipt by the linear motor 22 operative to provide the linear motor 22 resistance to such deviations caused by external forces exerted on the slide mass 12 or base mass 14.

Still referring to FIG. 3, the step of processing 84 includes the further step of generating 88 nominal position, velocity and acceleration values for the slide mass 12 relative to the base mass 14 based upon preselected position, velocity and acceleration values. The processing step 84 also includes the further steps of determining 90 the position, velocity and acceleration of the slide mass 12 relative to the base mass 14 and generating 92 a plurality of feedback signals corresponding thereto.

The step of determining 90 the position, velocity and acceleration of the slide mass 12 relative to the base mass 14 itself includes the further steps of amplifying 94 the first and second acceleration signals to maximize control gain, and calculating 96 the difference between the first and second acceleration signals to determine the acceleration of the slide mass 12 relative to the base mass 14. The step of determining 90 also includes the further step of differentiating 98 the position signal to determine the velocity of the slide mass 12 relative to the base mass 14.

Still referring to FIG. 3, the step of generating 92 a plurality of feedback signals itself includes the further step of utilizing 100 double integral lead type compensation with the relative acceleration signal to maximize control gain in the acceleration feedback loop of FIG. 2, thereby increasing linear motor stiffness. The step of generating 92 a plurality of feedback signals also includes the step of converting 102 the relative position and velocity signals from analog to digital form.

As previously mentioned, conventional mechanical machine tool drives have an inherent stiffness or resistance to external forces arising from friction between the component parts of the mechanical drive. In contrast, linear motors are driven by electromagnetic field variations and therefore lack any inherent stiffness to resist such external forces.

However, as previously discussed, linear motors can be provided with apparent stiffness through the use of the motor servo controls. Nevertheless, conventional linear motor applications have been able to generate measured stiffnesses only on the order of 10,000–50,000 lbs/inch. Conventional linear motor stiffnesses are therefore well below the stiffnesses necessary for high speed machine tool applications.

In contrast, the improved linear motor control system and method of the present invention are capable of generating stiffnesses of 170,000 lbs/inch and greater. Thus, the greater increased linear motor stiffness provided by the present invention allows linear motors to meet the quality control requirements of high speed machine tool applications.

The linear motor control system and method of the present invention have been described and shown herein in conjunction with a machine tool application. However, it should be readily apparent that the linear motor control system and method of the present invention are suitable for use in any application wherein linear motor stiffnesses on the order of 170,000 lbs/inch and higher may be required.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. In a linear motor for use with a slide mass moveable with respect to a base mass, a control system for providing motor resistance to external forces in accordance with selected operating parameters, comprising:

primary sensor means mountable to said slide mass for detecting the acceleration of said slide mass relative to ground and generating a first acceleration signal corresponding thereto;

secondary sensor means mountable to said base mass for detecting the acceleration of said base mass relative to ground and generating a second acceleration signal corresponding thereto; and signal processor means in electrical communication with said primary and secondary sensor means for receiving and processing said first and second acceleration signals and generating a motor control signal operative to provide said linear motor resistance to said external forces.

2. A linear motor control system as in claim 1 further comprising position detector means in electrical communication with said signal processor means for determining the position of said slide mass relative to said base mass and generating a position signal corresponding thereto, said position signal for receipt by said signal processor means.

3. A linear motor control system as in claim 1, wherein said primary and secondary sensor means are mounted so that detection of extraneous vibrations of said slide mass and base mass in the direction of movement of said slide mass is minimized.

4. A linear motor control system as in claim 1, wherein said signal processor means comprises:
feedback signal generating means in electrical communication with said primary and secondary sensor means for receiving said first and second acceleration signals and generating a feedback signal corresponding to the acceleration of said slide mass relative to said base mass; and
control means in electrical communication with said feedback signal generating means and said linear motor for receiving said feedback signal, determining the deviation of said acceleration parameter from a selected value caused by said external forces, and generating a corresponding motor control signal operative to provide said linear motor resistance to said acceleration deviations.

5. A linear motor control system as in claim 2, wherein said signal processor means comprises:
feedback signal generating means in electrical communication with said primary sensor means, secondary sensor means and position detector means for receiving said first and second acceleration signals and said position signal and generating a plurality of feedback signals corresponding to the position, velocity and acceleration of said slide mass relative to said base mass; and
control means in electrical communication with said feedback signal generating means and said linear motor for receiving said feedback signals, determining the deviation of said position, velocity and acceleration parameters from selected values caused by said external forces, and generating a corresponding motor control signal operative to provide said linear motor resistance to said position, velocity and acceleration deviations.

6. A linear motor control system as in claim 1, wherein said primary sensor means is a high bandwidth accelerometer assembly to maximize control system gain.

7. A linear motor control system as in claim 1, wherein said secondary sensor means is a high bandwidth accelerometer assembly to maximize control system gain.

8. A linear motor control system as in claim 4, wherein said feedback signal generating means comprises:
high bandwidth amplifier means in electrical communication with said primary and secondary sensor means for amplifying said first and second acceleration signals and maximizing control system gain; and
subtractor means in electrical communication with said amplifier means for receiving said first and second acceleration signals, calculating the difference therebetween to determine the acceleration of said slide mass relative to said base mass, and generating a relative acceleration signal corresponding thereto.

9. A linear motor control system as in claim 5, wherein said feedback signal generating means comprises:
high bandwidth amplifier means in electrical communication with said primary and secondary sensor means for amplifying said first and second acceleration signals and maximizing control system gain;
subtractor means in electrical communication with said amplifier means for receiving said first and second acceleration signals, calculating the difference therebetween to determine the acceleration of said slide mass relative to said base mass, and generating a relative acceleration signal corresponding thereto;
differentiator means in electrical communication with said position detector means for receiving and differentiating said position signal to determine the velocity of said slide mass relative to said base mass and generating a velocity signal corresponding thereto; and
convertor means in electrical communication with said differentiator means and said amplifier means for receiving said position and velocity signals and converting said signals from analog to digital form.

10. In a linear motor for use with a slide mass and a base mass, a method of providing motor resistance to external forces in accordance with selected operating parameters, comprising the steps of:
detecting the acceleration of said slide mass relative to ground;
generating a first acceleration signal corresponding to said detecting acceleration of said slide mass;
detecting the acceleration of said base mass relative to ground;
generating a second acceleration signal corresponding to said detecting acceleration of said base mass;
detecting the position of said slide mass relative to said base mass;
generating a position signal corresponding to the detecting position of said slide mass;
processing said first and second acceleration signals and said position signal to determine deviations of the position, velocity and acceleration of said slide mass relative to said base mass from selected values caused by said external forces; and
generating a motor control signal operative to provide said linear motor resistance to said deviations.

11. A linear motor control method as in claim 10, wherein the steps of processing comprises the steps of:
generating nominal position, velocity and acceleration values for said slide mass relative to said base mass based upon selected position, velocity and acceleration values;
determining the position, velocity and acceleration of said slide mass relative to said base mass;
generating a plurality of feedback signals corresponding to the position, velocity and acceleration of said slide mass relative to said base mass.

12. A linear motor control method as in claim 11, wherein the steps of determining the position, velocity and acceleration of said slide mass relative to said base mass comprises the steps of:
amplifying said first and second acceleration signals to maximize control gain;
calculating the difference between said first and second acceleration signals to determine the acceleration of said slide mass relative to said base mass; and
differentiating said position signal to determine the velocity of said slide mass relative to said base mass.

13. A linear motor control method as in claim 11, wherein the step of generating a plurality of feedback signals comprises the steps of:

utilizing double integral lead type compensation with said relative acceleration signal to maximize control gain; and converting said relative position and velocity signals from analog to digital form.

* * * * *